US010304053B1

(12) United States Patent
Templeton et al.

(10) Patent No.: US 10,304,053 B1
(45) Date of Patent: May 28, 2019

(54) SHOPPING CHECK-OUT WITH A PAYMENT CARD

(71) Applicant: Square, Inc., San Francisco, CA (US)

(72) Inventors: Thomas Templeton, San Francisco, CA (US); Keisuke Omi, Brooklyn, NY (US); Daniel Jeffrey Post, San Mateo, CA (US)

(73) Assignee: Square, Inc., San Francisco, CA (US)

( * ) Notice: Subject to any disclaimer, the term of this patent is extended or adjusted under 35 U.S.C. 154(b) by 1183 days.

(21) Appl. No.: 14/455,225

(22) Filed: Aug. 8, 2014

(51) Int. Cl.
G06Q 40/00 (2012.01)
G06Q 20/34 (2012.01)
G06Q 30/06 (2012.01)
G06Q 20/12 (2012.01)
G01B 15/00 (2006.01)
G01B 7/14 (2006.01)

(52) U.S. Cl.
CPC ............ G06Q 20/352 (2013.01); G01B 7/14 (2013.01); G01B 15/00 (2013.01); G06Q 20/12 (2013.01); G06Q 30/0601 (2013.01); G06Q 40/00 (2013.01)

(58) Field of Classification Search
CPC ................................ G06Q 40/00; G06K 7/10
See application file for complete search history.

(56) References Cited

U.S. PATENT DOCUMENTS 5,590,038 A 12/1996 Pitroda
6,427,911 B1 8/2002 Barnes et al.
8,280,793 B1 10/2012 Kempkes et al.
8,317,103 B1 11/2012 Foo et al.
8,577,731 B1 11/2013 Cope et al.
8,579,203 B1 11/2013 Lambeth et al.
8,590,796 B1 11/2013 Cloutier et al.
(Continued)

FOREIGN PATENT DOCUMENTS

JP H05333966 A 12/1993
WO 2015/061005 A1 4/2015
WO 2016/003831 A1 1/2016

OTHER PUBLICATIONS

Lakshmisha Honnegowda, Syin Chan, and Chiew Tong Lau, Security Enhancement for Magnetic Data Transaction in Electronic Payment and Healthcare Systems, Apr. 2013, IACSIT International Journal of Engineering and Technology, vol. 5, pp. 332-335 (Year: 2013).*

(Continued)

Primary Examiner — I Jung Liu
(74) Attorney, Agent, or Firm — Schott, P.C.

(57) ABSTRACT

A technique for providing a checkout experience using a payment card is disclosed. An electronic device at a store detects a movement of a product away from the store by using a first short-range wireless link. The electronic device then receives from the product information identifying the product. The electronic device also detects the presence of a payment card near the product around the same time that it detects the movement of the product, by using a second short-range wireless link. The electronic device then receives information from the payment card information identifying an account on a server system. Upon determining that the product is at least a certain distance away from the store for at least a certain amount of time, the electronic device processes a payment for the product by the owner of the account.

4 Claims, 6 Drawing Sheets

(56) References Cited

U.S. PATENT DOCUMENTS

| | | |
|---|---|---|
| 8,712,854 B1 | 4/2014 | Rafferty et al. |
| 8,788,418 B2 | 7/2014 | Spodak et al. |
| 8,939,357 B1 | 1/2015 | Perry |
| 8,972,298 B2 * | 3/2015 | Kunz .................. G06Q 40/00 705/41 |
| 9,010,644 B1 | 4/2015 | Workley |
| 9,092,767 B1 | 7/2015 | Andrews et al. |
| 9,135,545 B1 | 9/2015 | Lamba |
| 9,183,480 B1 | 11/2015 | Quigley et al. |
| 9,224,141 B1 | 12/2015 | Lamba et al. |
| 9,311,585 B1 | 4/2016 | Steshenko |
| 9,619,792 B1 | 4/2017 | Aaron et al. |
| 9,679,234 B2 | 6/2017 | Wade |
| 9,922,321 B2 | 3/2018 | Aaron et al. |
| 2003/0019942 A1 | 1/2003 | Blossom |
| 2003/0061157 A1 | 3/2003 | Hirka et al. |
| 2003/0065805 A1 | 4/2003 | Barnes, Jr. |
| 2004/0138999 A1 | 7/2004 | Friedman et al. |
| 2004/0158728 A1 | 8/2004 | Kim |
| 2005/0247785 A1 | 11/2005 | Bertin |
| 2006/0032906 A1 | 2/2006 | Sines |
| 2006/0206488 A1 | 9/2006 | Distasio |
| 2008/0078831 A1 * | 4/2008 | Johnson .................. G06Q 20/10 705/39 |
| 2008/0177826 A1 | 7/2008 | Pitroda |
| 2008/0197201 A1 | 8/2008 | Manessis et al. |
| 2008/0222047 A1 | 9/2008 | Boalt |
| 2009/0043702 A1 | 2/2009 | Bennett |
| 2009/0063312 A1 | 3/2009 | Hurst |
| 2009/0159663 A1 | 6/2009 | Mullen et al. |
| 2009/0159667 A1 | 6/2009 | Mullen et al. |
| 2009/0192904 A1 | 7/2009 | Patterson et al. |
| 2010/0102125 A1 | 4/2010 | Gatto |
| 2010/0218009 A1 | 8/2010 | Hoeksel et al. |
| 2011/0131128 A1 | 6/2011 | Vaananen |
| 2011/0174874 A1 | 7/2011 | Poznansky et al. |
| 2011/0180598 A1 | 7/2011 | Morgan et al. |
| 2011/0231270 A1 | 9/2011 | Dykes et al. |
| 2011/0238510 A1 * | 9/2011 | Rowen .................. G06Q 20/20 705/43 |
| 2011/0270747 A1 | 11/2011 | Xu |
| 2011/0295750 A1 | 12/2011 | Rammal |
| 2011/0313840 A1 | 12/2011 | Mason et al. |
| 2012/0059718 A1 | 3/2012 | Ramer et al. |
| 2012/0310760 A1 | 12/2012 | Phillips et al. |
| 2013/0024364 A1 | 1/2013 | Shrivastava et al. |
| 2013/0024371 A1 | 1/2013 | Hariramani et al. |
| 2013/0030997 A1 | 1/2013 | Spodak et al. |
| 2013/0048719 A1 | 2/2013 | Bennett |
| 2013/0117155 A1 | 5/2013 | Glasgo |
| 2013/0134216 A1 | 5/2013 | Spodak et al. |
| 2013/0134962 A1 | 5/2013 | Kamel et al. |
| 2013/0204777 A1 | 8/2013 | Irwin, Jr. et al. |
| 2013/0204793 A1 | 8/2013 | Kerridge et al. |
| 2013/0228616 A1 | 9/2013 | Bhosle et al. |
| 2013/0246218 A1 | 9/2013 | Gopalan |
| 2013/0248591 A1 | 9/2013 | Look et al. |
| 2013/0254227 A1 | 9/2013 | Shim et al. |
| 2013/0256403 A1 * | 10/2013 | MacKinnon Keith ....................... G06Q 20/20 235/375 |
| 2013/0284806 A1 * | 10/2013 | Margalit .................. G06Q 30/06 235/382 |
| 2014/0074655 A1 | 3/2014 | Lim et al. |
| 2014/0074716 A1 | 3/2014 | Ni |
| 2014/0084059 A1 | 3/2014 | Sierchio et al. |
| 2014/0101035 A1 | 4/2014 | Tanner et al. |
| 2014/0149282 A1 | 5/2014 | Philliou et al. |
| 2014/0159869 A1 * | 6/2014 | Zumsteg .................. G06K 7/0004 340/10.1 |
| 2014/0214567 A1 | 7/2014 | Llach et al. |
| 2015/0058146 A1 | 2/2015 | Gaddam et al. |
| 2015/0127553 A1 | 5/2015 | Sundaram et al. |
| 2015/0134513 A1 | 5/2015 | Olson et al. |
| 2016/0086166 A1 | 3/2016 | Pomeroy et al. |

OTHER PUBLICATIONS

Non-Final Office Action dated Jan. 20, 2017, for U.S. Appl. No. 14/168,274, of Odawa, A.W., et al., filed Jan. 30, 2014.
U.S. Appl. No. 14/168,274 of Odawa, A. et al., filed Jan. 30, 2014.
U.S. Appl. No. 14/445,287 of Templeton, T. et al., filed Aug. 8, 2014.
U.S. Appl. No. 14/455,220 of Templeton, T. et al., filed Aug. 8, 2014.
Non-Final Office Action dated Apr. 27, 2017, for U.S. Appl. No. 14/455,220, of Templeton, T., et al., filed Aug. 8, 2014.
Final Office Action dated May 19, 2017, for U.S. Appl. No. 14/168,274, of Odawa, A.W., et al., filed Jan. 30, 2014.
Final Office Action dated Sep. 29, 2017, for U.S. Appl. No. 14/455,220, of Templeton, T., et al., filed Aug. 8, 2014.
"Bluetooth Accessory Design Guidelines for Apple Products," Apple Inc., dated Sep. 18, 2013, Retrieved from the Internet URL: https://developer.apple.com/hardwaredrivers/BluetoothDesignGuidelines.pdf, pp. 1-40.
Chiraag, "A payment Card that Changes Magnetic Stripe via Smartphone," published Nov. 12, 2013, Retrieved from the Internet URL: https://letstalkpayments.com/card-changes-magnetic-stripe-via-smartphone/, on Jan. 3, 2018, pp. 1-6.
Non-Final Office Action dated Jan. 9, 2015, for U.S. Appl. No. 14/145,895 of Aaron, P., et al., filed Dec. 31, 2013.
Non-Final Office Action dated Feb. 6, 2015, for U.S. Appl. No. 14/478,522, of Lamba, K., filed Sep. 5, 2014.
Non-Final Office Action dated Feb. 18, 2015, for U.S. Appl. No. 14/244,632, of Quigley, O.S.C., et al., filed Apr. 3, 2014.
Non-Final Office Action dated May 12, 2015, for U.S. Appl. No. 14/189,869 of Lamba, K., et al., filed Feb. 25, 2014.
Non-Final Office Action dated May 26, 2015, for U.S. Appl. No. 14/225,338, of Aaron, P., et al., filed Mar. 25, 2014.
Non-Final Office Action dated May 27, 2015, for U.S. Appl. No. 14/197,704, of Lamba, K., et al., filed Mar. 5, 2014.
Notice of Allowance dated Jun. 3, 2015, for U.S. Appl. No. 14/478,522, of Lamba, K., filed Sep. 5, 2014.
Notice of Allowance dated Jul. 6, 2015, for U.S. Appl. No. 14/244,632, of Quigley, O.S.C., et al., filed Apr. 3, 2014.
Final Office Action dated Aug. 18, 2015, for U.S. Appl. No. 14/145,895, of Aaron, P., et al., filed Dec. 31, 2013.
Notice of Allowance dated Sep. 3, 2015, for U.S. Appl. No. 14/244,632, of Quigley, O.S.C., et al., filed Apr. 3, 2014.
Notice of Allowance dated Sep. 18, 2015, for U.S. Appl. No. 14/197,704, of Lamba, K., et al., filed Mar. 5, 2014.
Non-Final Office Action dated Sep. 23, 2015, for U.S. Appl. No. 14/478,601, of Steshenko, R.T.S.V., filed Sep. 5, 2014.
Final Office Action dated Oct. 2, 2015, for U.S. Appl. No. 14/225,338, of Aaron, P., et al., filed Mar. 25, 2014.
Advisory Action dated Dec. 31, 2015, for U.S. Appl. No. 14/225,338, of Aaron, P., et al., filed Mar. 25, 2014.
Non-Final Office Action dated Jan. 22, 2016, for U.S. Appl. No. 14/189,869, of Lamba, K., et al., filed Feb. 25, 2014.
Notice of Allowance dated Feb. 8, 2016, for U.S. Appl. No. 14/478,601, of Steshenko, R.T.S.V., filed Sep. 5, 2014.
Non-Final Office Action dated Mar. 24, 2016, for U.S. Appl. No. 14/145,895, of Aaron, P., et al., filed Dec. 31, 2013.
Non-Final Office Action dated May 9, 2016, for U.S. Appl. No. 14/225,338, of Aaron, P., et al., filed Mar. 25, 2014.
Final Office Action dated Jul. 18, 2016, for U.S. Appl. No. 14/189,869, of Lamba, K., et al., filed Feb. 25, 2014.
Non-Final Office Action dated Aug. 4, 2016, for U.S. Appl. No. 14/321,429, of Wade, J., filed Jul. 1, 2014.
Final Office Action dated Sep. 1, 2016, for U.S. Appl. No. 14/225,338, of Aaron, P., et al., filed Mar. 25, 2014.
Advisory Action dated Oct. 11, 2016, for U.S. Appl. No. 14/189,869, of Lamba, K., et al., filed Feb. 25, 2014.

(56) References Cited

OTHER PUBLICATIONS

Final Office Action dated Oct. 12, 2016, for U.S. Appl. No. 14/145,895, of Aaron, P., et al., filed Dec. 31, 2013.
Non-Final Office Action dated Nov. 3, 2016, for U.S. Appl. No. 14/225,342, of Lamba, K., et al., filed Mar. 25, 2014.
Notice of Allowance dated Nov. 8, 2016, for U.S. Appl. No. 14/225,338, of Aaron, P., et al., filed Mar. 25, 2014.
Advisory Action dated Dec. 22, 2016, for U.S. Appl. No. 14/145,895, of Aaron, P., et al., filed Dec. 31, 2013.
Notice of Allowance dated Feb. 7, 2017, for U.S. Appl. No. 14/321,429, of Wade, J., filed Jul. 1, 2014.
Final Office Action dated Mar. 10, 2017, for U.S. Appl. No. 14/225,342, of Lamba, K., et al., filed Mar. 25, 2014.
Non-Final Office Action dated Mar. 13, 2017, for U.S. Appl. No. 14/189,869, of Lamba, K., et al., filed Feb. 25, 2014.
Non-Final Office Action dated Apr. 12, 2017, for U.S. Appl. No. 14/145,895, of Aaron, P., et al., filed Dec. 31, 2013.
Advisory Action dated Jun. 9, 2017, for U.S. Appl. No. 14/225,342, of Lamba, K., et al., filed Mar. 25, 2014.
Non-Final Office Action dated Jun. 29, 2017, for U.S. Appl. No. 14/189,869, of Lamba, K., et al., filed Feb. 25, 2014.
Notice of Allowance dated Nov. 9, 2017, for U.S. Appl. No. 14/145,895, of Aaron, P., et al., filed Dec. 31, 2013.
Advisory Action dated Dec. 11, 2017, for U.S. Appl. No. 14/455,220, of Templeton, T., et al., filed Aug. 8, 2014.
Final Office Action dated Jan. 8, 2018, for U.S. Appl. No. 14/189,869, of Lamba, K., et al.al., filed Feb. 25, 2014.
Office Action for European Patent Application No. 14855987.5, mailed Mar. 23, 2018.
Advisory Action dated Apr. 12, 2018, for U.S. Appl. No. 14/189,869, of Lamba, K., et al., filed Feb. 25, 2014.
International Search Report and Written Opinion for International Application No. PCT/US2014/058447, dated Jan. 15, 2015.
International Search Report and Written Opinion for International Application No. PCT/US2015/038165, dated Sep. 17, 2015.
Extended European Search Report for European Patent Application No. 14855987.5, dated May 10, 2017.

* cited by examiner

SHOPPING CHECK-OUT WITH A PAYMENT CARD

BACKGROUND

A checkout process in a store typically involves a customer getting in a checkout line, scanning the items that the customer has picked up one by one, identifying a payment method and waiting for the payment to be processed or approved. This process can be time-consuming, inconvenient and tedious for the customer, especially when there are many customers in line, many items to be scanned, or any difficulty with the chosen payment method.

BRIEF DESCRIPTION OF THE DRAWINGS

Embodiments of the present invention will be described and explained through the use of the accompanying drawings in which.

DETAILED DESCRIPTION

Figure 1A:
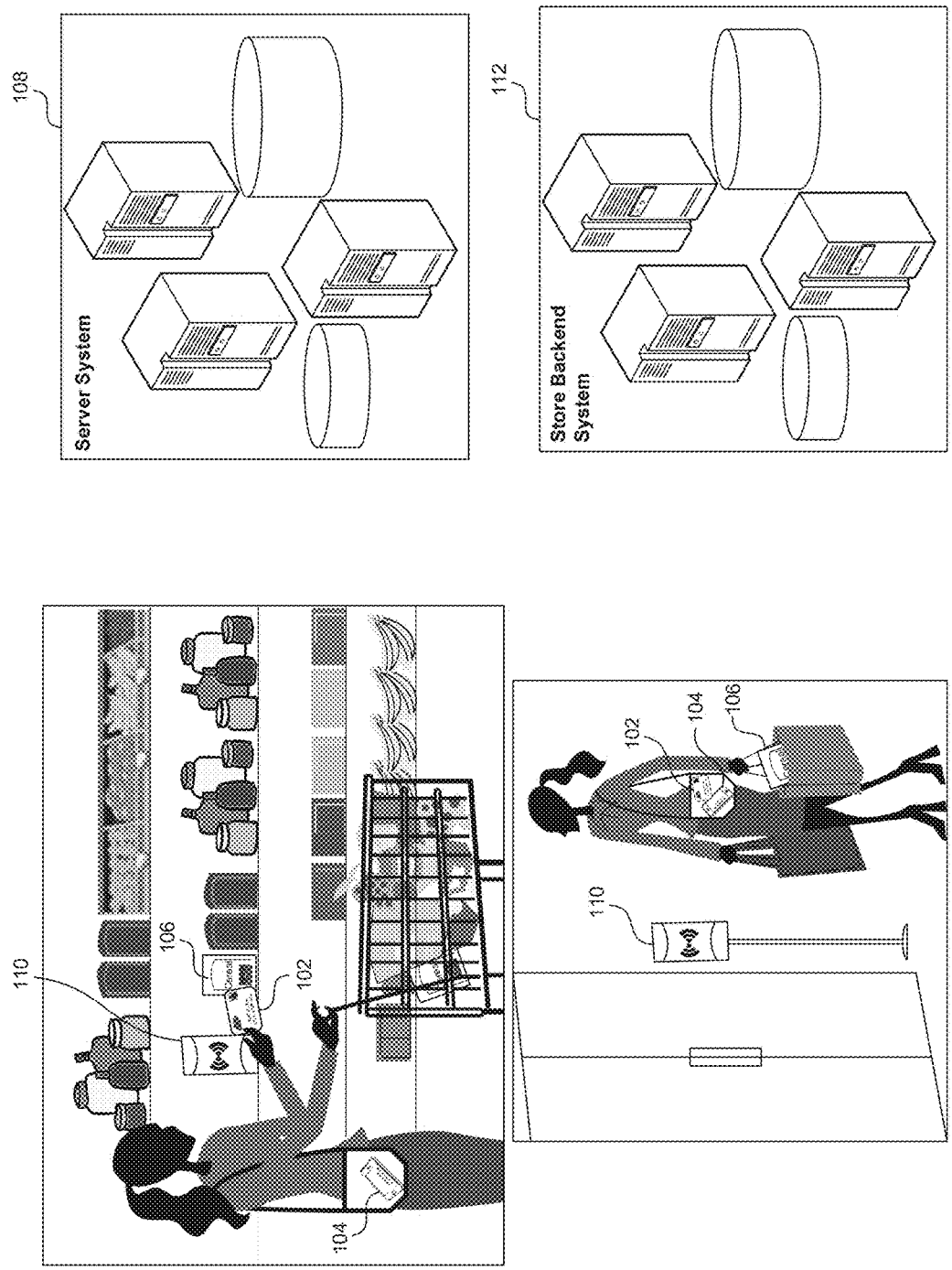
FIG. 1A illustrates an example environment in which a payment card, a mobile device, a server system, an electronic sensing device and a store backend system communicate with one other to facilitate a consumer checkout process.

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

Introduced here is a technique related to providing a consumer with a checkout experience using a payment card, which allows the consumer to shop for items in a store and conclude the shopping experience without having to go through a traditional (time-consuming) checkout process. In the technique, the consumer carries a payment card. A "payment card", as used herein, is essentially identical or similar in appearance to a traditional payment card, such as a credit or debit card. However, it includes a processor and memory capable of data processing functionality. Specifically, it stores information identifying a service account on a server system which manages service accounts that can be linked to other accounts corresponding to traditional payment cards. In addition, the payment card includes circuitry to carry out short-range (typically less than 100 meters) wireless communication. An example of the short-range wireless communication technology is Bluetooth Low Energy (BLE). The circuitry may also function as a tag or a scanner in supporting other short-range wireless communication technologies, such as Radio-Frequency Identification (RFID) or Near Field Communication (NFC). The consumer may also carry a mobile device. The mobile device contains an application which is downloaded from the server system or a third-party application store and stores information on the mobile phone identifying a service account on the server system. The mobile device typically has built-in Global Positioning System (GPS) features and may support geofencing for location detection. The mobile device further supports short-range wireless communication technologies, such as RFID, NFC, Bluetooth, Wi-Fi or BLE.

At the end of the shopping experience, the total price of the items picked up by the consumer from the store is automatically charged to a funding source of the consumer based on the information on the payment card. Specifically, the store electronically tags each item on any of its shelves with pricing information, using NFC or RFID, for example. It also sets up electronic sensing devices supporting short-range wireless communication, such as Apple iBeacons, RFID scanners and NFC sensors, throughout the store. As the consumer shops around the store, the electronic sensing devices read information from the consumer's payment card and the consumer's mobile device. They or a backend system to which they are attached further determine which items have been removed by the consumer from the store, and calculate the total price of those items. Alternatively, the payment card or the mobile device can make such determination and/or calculation.

Figure 1B:
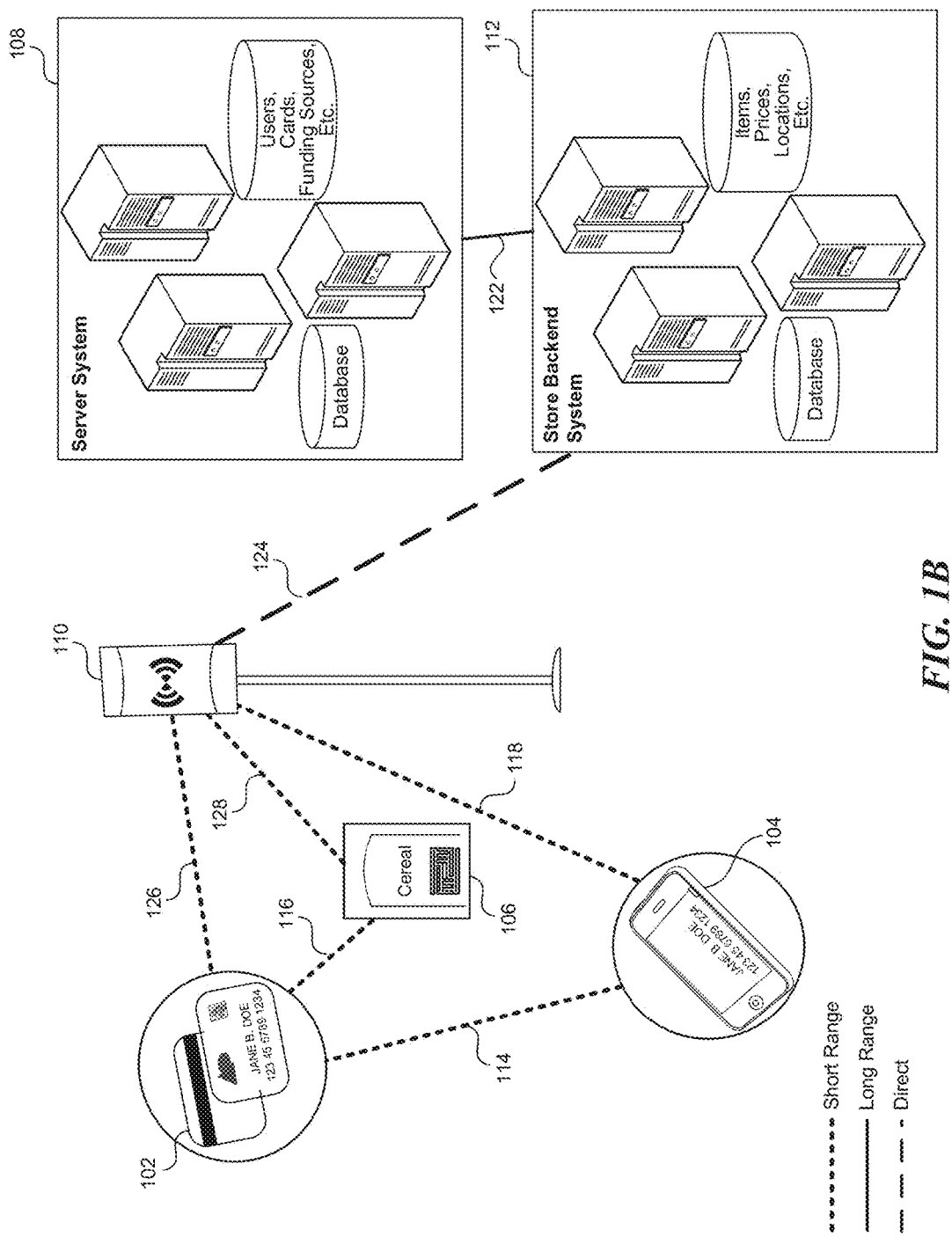
FIG. 1B illustrates example communication channels among the various devices and systems.

FIG. 1A illustrates an example environment in which a payment card, a mobile device, a server system, an electronic sensing device and a store backend system communicate with one other to facilitate a consumer checkout process. FIG. 1B illustrates example communication channels among the various devices and systems. In some embodiments, a consumer registers with a server system 108 that includes one or more processors and databases, through the Internet, for example. The registration process may require the consumer to provide various types of information to establish an account, such as identification and demographic information, including the consumer's name, information regarding the consumer's credit card accounts, bank accounts and other funding sources, information regarding the consumer's shopping preferences and spending patterns, etc. The server system 108 then saves the account information in the databases. After registering, the consumer receives a payment card 102 that supports one or more short-range wireless communication technologies, such as RFID, NFC, Wi-Fi, Bluetooth and/or BLE, and stores information identifying the consumer's account, such as an account number.

In some embodiments, a store electronically tags each item 106 for sale with identification and pricing information, using RFID or NFC, for example. The merchant also sets up electronic sensing devices 110 capable of short-range wireless communication, such as Apple iBeacons, RFID scanners and NFC sensors, throughout the store, such as on each shelf, at the entrance and/or at the exit. Each electronic sensing device 110 can determine whether an item 106 is present at or absent from a particular shelf or the store. The communication channel 128 between the item 106 and the electronic sensing device 110 may be implemented by RFID or NFC, for example. In addition, the store has a backend system 112, such as a point-of-sale (POS) system, to which the electronic sensing devices 110 are attached. The backend system 112 is a computer system that maintains or has access to inventory information, including, for each item 106, where it is located and how much it costs. The electronic sensing device 110 can report whether the item 106 is present at or absent from a particular shelf or the store to the backend system 112. The communication channel 124 between the electronic sensing device 110 and the backend system 112 can be implemented as a direct connection, for example.

In some embodiments, a consumer carries the payment card 102 and a mobile device 104, which supports one or more short-range wireless communication technologies, such as NFC, RFID, Wi-Fi, Bluetooth and/or BLE, and stores information identifying an account on the server system 108. The mobile device 104 can be a phone, a camera, a watch, a tablet computer, a laptop computer, or a personal digital assistant, for example. As the consumer walks around the store, the consumer may obtain the price of an item on the shelf, such as the item 106, by scanning the item with the payment card 102. The communication channel 116 between the payment card 102 and the item 106 may be implemented by RFID or NFC, for example.

In some embodiments, as the consumer walks within, into, or out of the store, the electronic sensing device 110 determines whether the payment card 102 or the mobile device 104 is in proximity to the item 106 or the store. The communication channel 126 between the payment card 102 and the electronic sensing device 110 may be implemented by Bluetooth, Wi-Fi, BLE, NFC or RFID, for example. The communication channel 118 between the mobile device 104 and the electronic sensing device 110 may be implemented by Wi-Fi, BLE, RFID, Bluetooth or NFC, for example. The electronic sensing device 110 receives information that is stored on the payment card 102 and identifies the account on the server system 108 from the payment card 102 and information that is stored on the mobile device 104 and identifies the account on the server system 108 from the mobile device 104. The electronic sensing device 110 may verify or rely on the backend system 112 to verify that the information stored on the payment card 102 and the information stored on the mobile device 104 match, which is an indication that the payment card 102 and the mobile device 104 are both in the possession of the owner of the same account.

In some embodiments, as the consumer picks up the item 106 from the shelf or puts it back on the shelf, the electronic sensing device 110 detects the absence of the item 106 from or the presence at the shelf, respectively. Similarly, as the consumer walks out of or into the store with the item 106, the electronic sensing device 110 detects the departure of the item 106 from or the reentrance of the item 106 into the store, respectively. As the electronic sensing device 110 also detects the presence of the payment card 102 and the mobile device 104, it can correlate the location of the item 106 with the location of the consumer for the same point in time and thus associate a movement of the item 106 with the account on the server system 108. The electronic sensing device 110 then reports information regarding a movement of the item 106 with respect to the shelf or the store to the backend system 112, including a timestamp, the information stored on the payment card 102 and/or the information stored on the mobile device 104. Specifically, the electronic sensing device 110 transmits relevant information to the backend system 112 when it determines that the item 106 has left the store, in terms of being at least a specified distance away from the store for at least a specified amount of time, for example.

In some embodiments, upon receiving the information from the electronic sensing device 110, the backend system 112 calculates a total price for the items carried by the consumer out of the store based on the pricing information stored in the databases and sends the total price as well as information identifying the consumer's account to the server system 108. The communication channel 122 between the store backend system 112 and the server system 108 may be implemented by any known or convenient network technologies, such as LAN or the Internet. The server system 108 then charges the total price to a funding source associated with the consumer's account.

Instead of relying on the electronic sensing device 110 to detect the presence of the payment card 102 and the item 106 and to associate a movement of the item 106 with the consumer's account on the server system 108, the payment card 102 may detect the presence of the item 106 nearby, which leads to an association of the account on the server system 108 identified by the information stored on the payment card with the item 106. This approach may help reduce the load of the electronic sensing device 110. In some embodiments, as the consumer walks out of or into the store with the item 106, the payment card 102 receives from the electronic sensing device 110 a request to transmit information identifying a nearby product. In response, the payment card 102 reads from the item 106 information identifying the item 106. The payment card 102 then sends the read information as well as the information that is stored on the payment card 102 and identifies the account on the server system 108 to the electronic sensing device 110. Upon determining that the item 106 has left the store with the consumer, the electronic sensing device 110 and/or the backend system 112 then process a payment for the item 106.

Alternatively, the payment card 102 communicates with the mobile device 104 instead of the electronic sensing device 110. The communication channel 114 between the mobile device 104 and the payment card 102 may be implemented using Wi-Fi, BLE, RFID, Bluetooth or NFC, for example. In this case, the payment card 102 may encrypt the information that is stored on the payment card 102 and identifies the account on the server system 108 before transmission the mobile device 104 for security purposes and still rely on the electronic sensing device 110 or the store backend system 112 to determine whether the information stored on the payment card 102 and the information stored on the mobile device 104 match. The encryption prevents a mobile device that does not belong to the consumer but that happens to be near the payment card 102 from accessing the information identifying the consumer's account. The store through the electronic sensing device 110 or the backend system 112 is the one who is capable of performing the decryption.

The mobile device 104 may have a better capacity for data processing than the payment card 102, and specifically may be better suited for keeping track of the location of an item and determining when a payment for the item should be processed. Therefore, relying on these data processing capabilities of the mobile device 104 may help further reduce the load of the electronic sensing device 110. Therefore, in some embodiments, the mobile device 104 initially receives from the electronic sensing device 110 a request to start a checkout process. Then, as the consumer walks out of or into the store with the item 106, the mobile device 104 determines its current location with respect to the store. The mobile device 104 sends to the payment card 102 at various points in time a request to transmit information identifying any nearby item, to determine the location of any item that is near the payment card 102. In response, the mobile device 104 receives the information that is stored on the payment card 102 and identifies the account on the server system 108, which may be encrypted, as well as the information identifying the item 106 from the payment card 102.

In some embodiments, when the mobile device 104 determines that the item 106 has left the store (e.g., is at least a specified distance away from the store for a specified amount of time), the mobile device 104 sends the information received from the payment card 102 and the information that is stored on the mobile device 104 and identifies the account on the server system 108 to the electronic sensing device 110 and/or the backend system 112, which then process a payment for the item 106.

Figure 2:
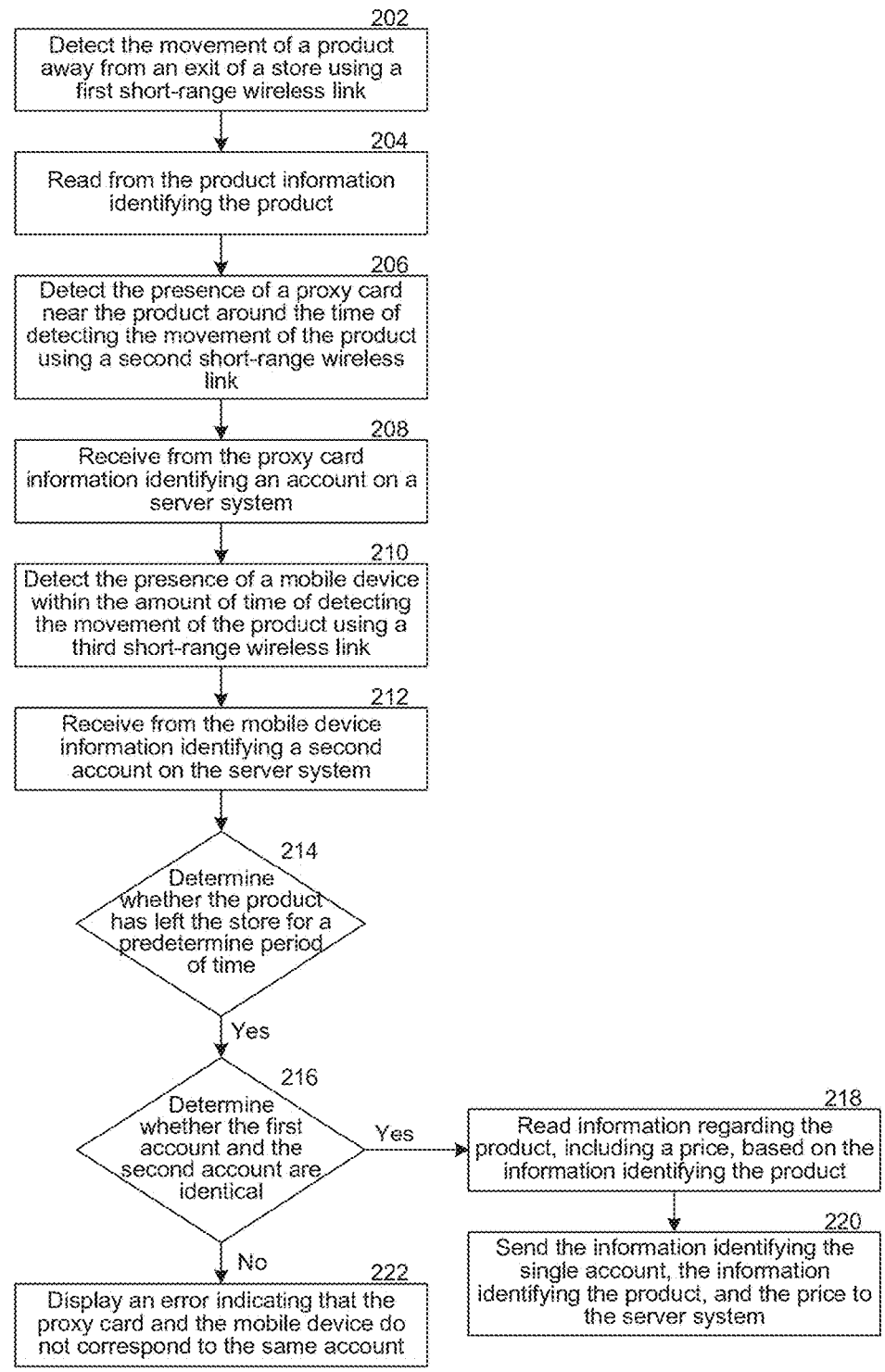
FIG. 2 is a flow diagram illustrating an example consumer checkout process performed by an electronic device at a store.

FIG. 2 is a flow diagram illustrating an example consumer checkout process performed by an electronic device. In this example, the electronic device includes a sensing component that is located at the entrance or the exit of a store for detecting the presence of a product, a payment card, or a mobile device. The electronic device also includes a backend component to which the sensing component is connected for more advanced tasks, such as Internet communication. In step 202, the electronic device detects the movement of a product away from the exit of the store using a first short-range wireless link, which may be implemented by RFID or NFC, for example. In general, the electronic device is able to determine that a product is at a certain location within a range of distances, and the movement may be reflected in the fact that the product is farther away at a later time. In step 204, the electronic device reads, from the product, information identifying the product, such as a product number.

In step 206, the electronic device detects the presence of a payment card near the product around the time of detecting the movement of the product using a second short-range wireless link, which may be implemented by RFID, Wi-Fi, NFC, Bluetooth or BLE, for example. In step 208, the electronic device receives from the payment card information that is stored on the payment card and identifies an account on a server system. When the distance between the product and the payment card is no more than the normal distance between a consumer and a shopping bag carried by the consumer, it is very likely that it is the holder of the account who is carrying the product. Therefore, in that case the electronic device may associate the movement of the product with the account.

In step 210, the electronic device detects the presence of a mobile phone also near the product around the time of detecting the movement of the product using a third short-range wireless link, which may be implemented by Wi-Fi, BLE, RFID, Bluetooth or NFC, for example. The mobile device may be, for example, a phone, a camera, a watch, eyewear, a tablet computer, a laptop computer, a personal digital assistant, etc. In step 212, the electronic device receives from the mobile device information that is stored on the mobile device and identifies an account on the server system.

In step 214, the electronic device determines whether the product has left the store. For example, it can determine whether the product is at least a certain distance away from the exit of the store for at least a certain amount of time. Following a positive determination result from step 214, in step 216, the electronic device determines whether the information stored on the payment card and the information stored on the mobile device match. The electronic device may not require the presence of both a mobile device and a payment card that identify the same account, but such a requirement helps authenticate the owner of the same account. Following a positive determination result from step 216, the electronic device proceeds to handle a purchase of the product. In step 218, the electronic device looks up the product using the information identifying the product to obtain the price of the product. In step 220, the electronic device sends the information identifying the product, the price, and the information identifying the associated account to the server system, which can then process the payment of the price for the product. Following a negative determination result from step 216, in step 222, the electronic device displays an error indicating that the payment card and the electronic device do not correspond to the same account. In response to the error indication, the store may decide whether to still handle a purchase of the product or alert the local authority for a potential identity theft, for example.

Figure 3:
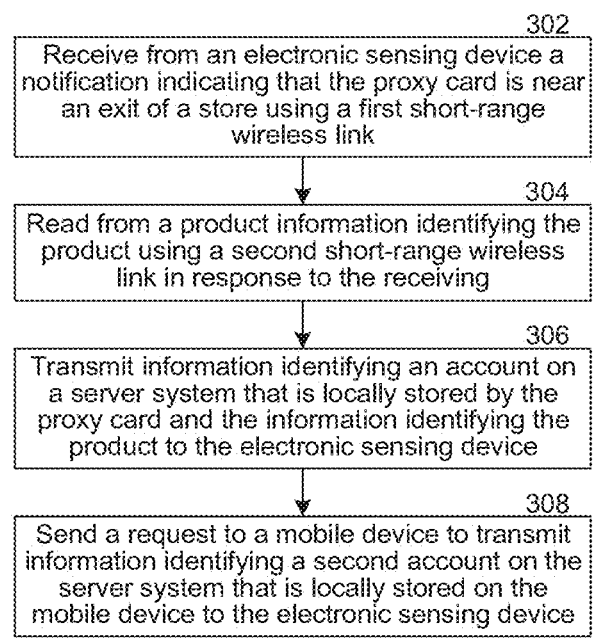
FIG. 3 is a flow diagram illustrating an example consumer checkout process performed by a payment card carried by a consumer.

FIG. 3 is a flow diagram illustrating an example consumer checkout process performed by a payment card, which stores information identifying an account on a server system. This process may be used in conjunction with the process illustrated in FIG. 2. In this process, instead of an electronic sensing device at the exit of a store determining which products are carried away from the store by a consumer, a payment card determines which products are being carried by a consumer, and sends the determination result to an electronic sensing device at the exit of the store, while relying on the electronic sensing device to determine when the payment card is being carried away from the store.

In step 302, the payment card receives from an electronic sensing device at the exit or the entrance of a store a notification that the payment card is near the exit or the entrance of the store using a first short-range wireless link, which can be implemented by RFID, Wi-Fi, NFC, Bluetooth or BLE, for example. In response to the notification, in step 304, the payment card reads from a nearby product information identifying the product using a second short-range wireless link, which can be implemented by RFID or NFC, for example. When the distance between the product and the payment card is no more than the normal distance between a consumer and a shopping bag carried by the consumer, it is very likely that it is the holder of the account that is carrying the product. In step 306, the payment card transmits the information identifying the product as well as the information that is stored on the payment card and identifies the account on the server system to the electronic sensing device. If it can detect the presence of more than one product upon receiving the notification, the payment card may accumulate the information read from these products and send it all at once to the electronic sensing device.

Overall, the payment card can communicate with the electronic sensing device to make known its location and thus the location of nearby products, which enables the electronic sensing device to determine where the products are relative to the exit of the store. A mobile device that is near the payment card may play the same role as the electronic sensing device.

In step 308, the payment card also sends a request to a mobile device nearby to transmit information that is stored on the mobile device and identifies an account on the server system to the electronic sensing device. Upon receiving the information identifying the second account from the mobile device, the electronic sensing device may determine whether the first and the second accounts match to assess the security of the use of the payment card.

Figure 4:
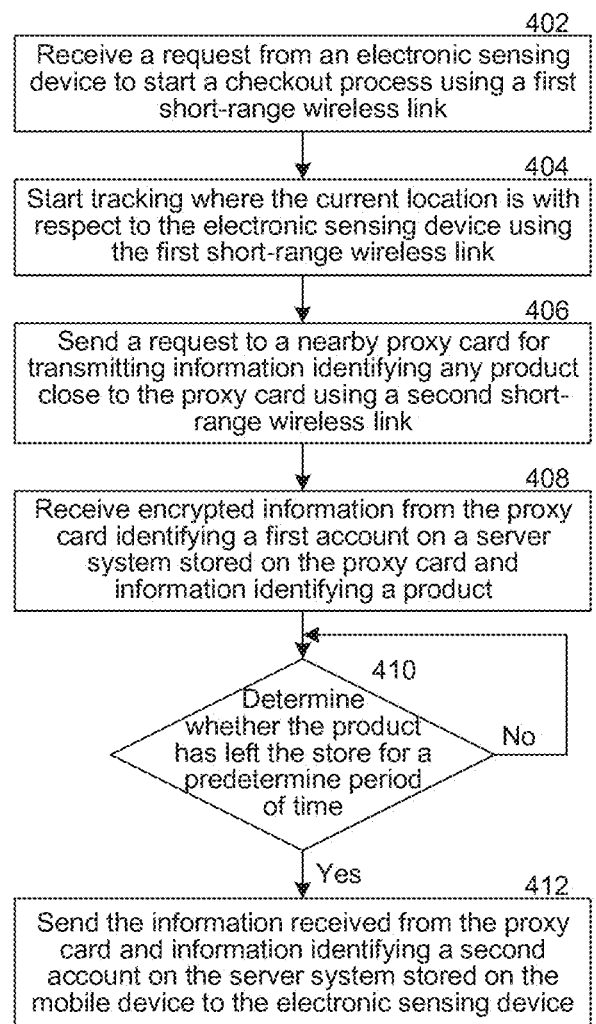
FIG. 4 is a flow diagram illustrating an example consumer checkout process performed by a mobile device carried by a consumer.

FIG. 4 is a flow diagram illustrating an example consumer checkout process performed by the mobile device. This process may be used in conjunction with the processes illustrated in FIGS. 2 and 3. In step 402, the mobile device receives a request from an electronic sensing device of a store, which is typically at an entrance or an exit of the store, to start a checkout process using a first short-range wireless link, which may be implemented by Wi-Fi, RFID, BLE, Bluetooth or NFC, for example. In response to the request, in step 404, the mobile device starts tracking where the current location is with respect to the electronic sensing device using the first short-range wireless link. Furthermore, in step 406, the mobile device sends a request to a nearby payment card for transmitting information identifying any product close to the payment card using a second short-range wireless link, which can be implemented by Wi-Fi, BLE, RFID, Bluetooth or NFC, for example. It may send such requests at various points in time corresponding to various distances away from the electronic sensing device to determine the movement of products together with the payment card.

Subsequently, in step 408, the mobile device receives from the payment card encrypted information that is stored on the payment card and identifies an account on a server system and information identifying a product near the payment card. The information is encrypted for security purposes and is to be decrypted by the electronic sensing device or an associated backend system. In step 410, the mobile device determines whether the product is now sufficiently far away from the exit of the store for a sufficiently long period of time. Upon a positive determination result, in step 412, the mobile device sends the information received from the payment card as well as information that is stored on the mobile device and identifies an account on the server system to the electronic sensing device in response to the request for starting the checkout process. Upon a negative determination result, in step 414, the mobile device takes no action at the moment but returns to step 410 at a later time.

Figure 5:
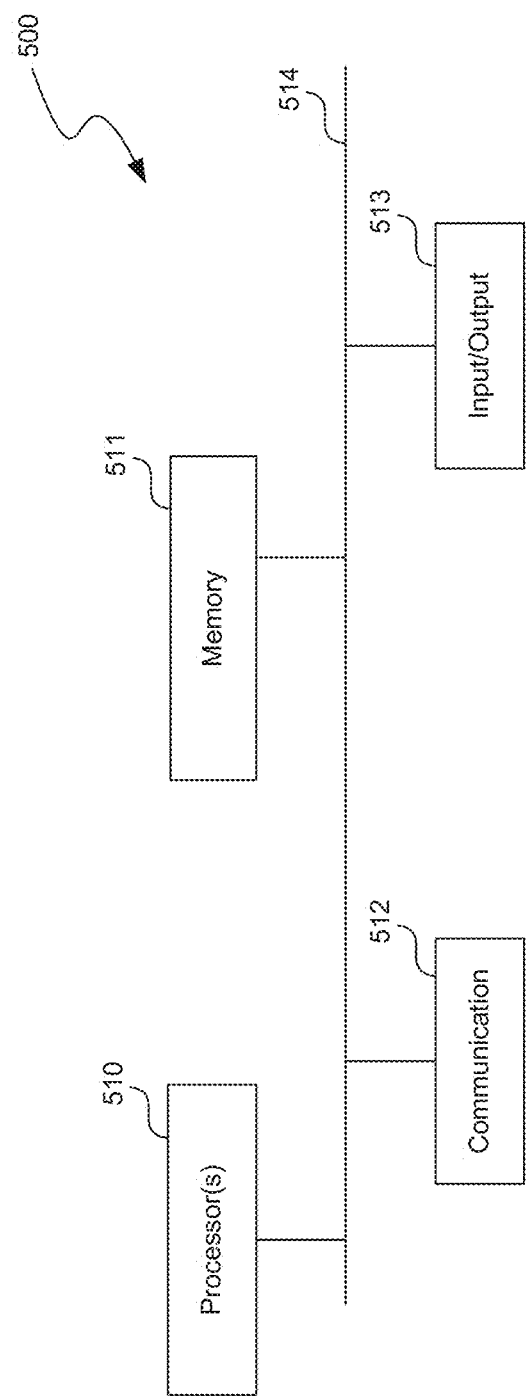
FIG. 5 is a high-level block diagram showing an example of a processing device that can represent any of the devices described above, including a payment card, a mobile device, an electronic sensing device, a server system, and a store backend system.

FIG. 5 is a high-level block diagram showing an example of a processing device 500 that can represent any of the devices described above, such as a payment card, a mobile device, an electronic sensing device, a store backend system, and a server system. Any of these systems may include one or more processing devices such as represented in FIG. 5, which may be coupled to each other via a network or multiple networks.

In the illustrated embodiment, the processing system 500 includes one or more processors 510, memory 511, a communication device 512, and one or more input/output (I/O) devices 513, all coupled to each other through an interconnect 514. In some embodiments, the processing system 500 may not have any I/O devices 513. The interconnect 514 may be or include one or more conductive traces, buses, point-to-point connections, controllers, adapters and/or other conventional connection devices. The processor(s) 510 may be or include, for example, one or more general-purpose programmable microprocessors, microcontrollers, application specific integrated circuits (ASICs), programmable gate arrays, or the like, or a combination of such devices. The processor(s) 510 control the overall operation of the processing device 500. Memory 511 may be or include one or more physical storage devices, which may be in the form of random access memory (RAM), read-only memory (ROM) (which may be erasable and programmable), non-volatile memory such as flash memory, miniature hard disk drive, or other suitable type of storage device, or a combination of such devices. Memory 511 may store data and instructions that configure the processor(s) 510 to execute operations in accordance with the techniques described above. The communication device 512 may be or include, for example, an Ethernet adapter, cable modem, Wi-Fi adapter, cellular transceiver, Bluetooth transceiver, or the like, or a combination thereof. For an electronic sensing device of a merchant, or a payment card or an electronic device of a consumer, the communication device 512 supports at least one technology for short-range wireless communication. Depending on the specific nature and purpose of the processing device 500, the I/O devices 513 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Although the present invention has been described with reference to specific exemplary embodiments, it will be recognized that the invention is not limited to the embodiments described but can be practiced with modification and alteration within the spirit and scope of the appended claims. Accordingly, the specification and drawings are to be regarded in an illustrative sense rather than a restrictive sense.

The invention claimed is:

1. A method performed by an electronic sensing device, the method comprising:
   detecting, by the electronic sensing device, in a store, a movement of a product away from the store, by using a first short-range wireless path;
   detecting, by the electronic sensing device, a presence of a payment card within a first specified distance of the product and within a first specified amount of time of detecting the movement of the product, by using a second short-range wireless path;
   sending, by the electronic sensing device, to the payment card, a request to transmit information identifying the product;
   receiving, by the electronic sensing device, from the payment card, the information identifying the product and first information identifying an account on a server system, wherein the server system offers a payment service and manages accounts that are each associated with a funding source;

detecting, by the electronic sensing device, a presence of a mobile device within the first specified amount of time of detecting the movement of the product, by using a third short-range wireless path;

receiving, by the electronic sensing device, from the mobile device, second information identifying an account on the server system;

determining, by the electronic sensing device, whether the product is at least a second specified distance away from the store for more than a second specified amount of time;

determining, by the electronic sensing device, whether the first information and the second information match; and in response to a first determination result indicating that the product is at least the second specified distance away from the store for more than the second specified amount of time and a second determination result indicating that the first information and the second information match, obtaining, by the electronic sensing device, information regarding the product, including a price, based on the information identifying the product;

sending, by the electronic sensing device, the first information, the information identifying the product, and the price to the server system; and receiving, by the electronic sensing device, a response from the server system confirming that the product is purchased using the account, wherein the mobile device includes a Radio-Frequency Identification (RFID) scanner, a Bluetooth Low Energy (BLE) scanner, or a Near Field Communication (NFC) scanner, and wherein the first, second, or third short-range wireless path is implemented using Radio-Frequency Identification (RFID), Near Field Communication (NFC), Wi-Fi, Bluetooth, or Bluetooth Low Energy (BLE).

2. The method of claim 1, further comprising keeping track of a location of the product using the first short-range wireless path.

3. The method of claim 1, further comprising:
receiving, by the electronic sensing device, from the server system, information regarding the account, wherein the information regarding the account comprises information of an associated funding source; and
requesting, by the electronic sensing device, an authorization of a payment of the price from the associated funding source.

4. The method of claim 1, wherein the mobile device is a phone, a camera, a watch, eyewear, a tablet computer, a laptop computer, or a personal digital assistant.

* * * * *